United States Patent Office 3,342,061
Patented Sept. 19, 1967

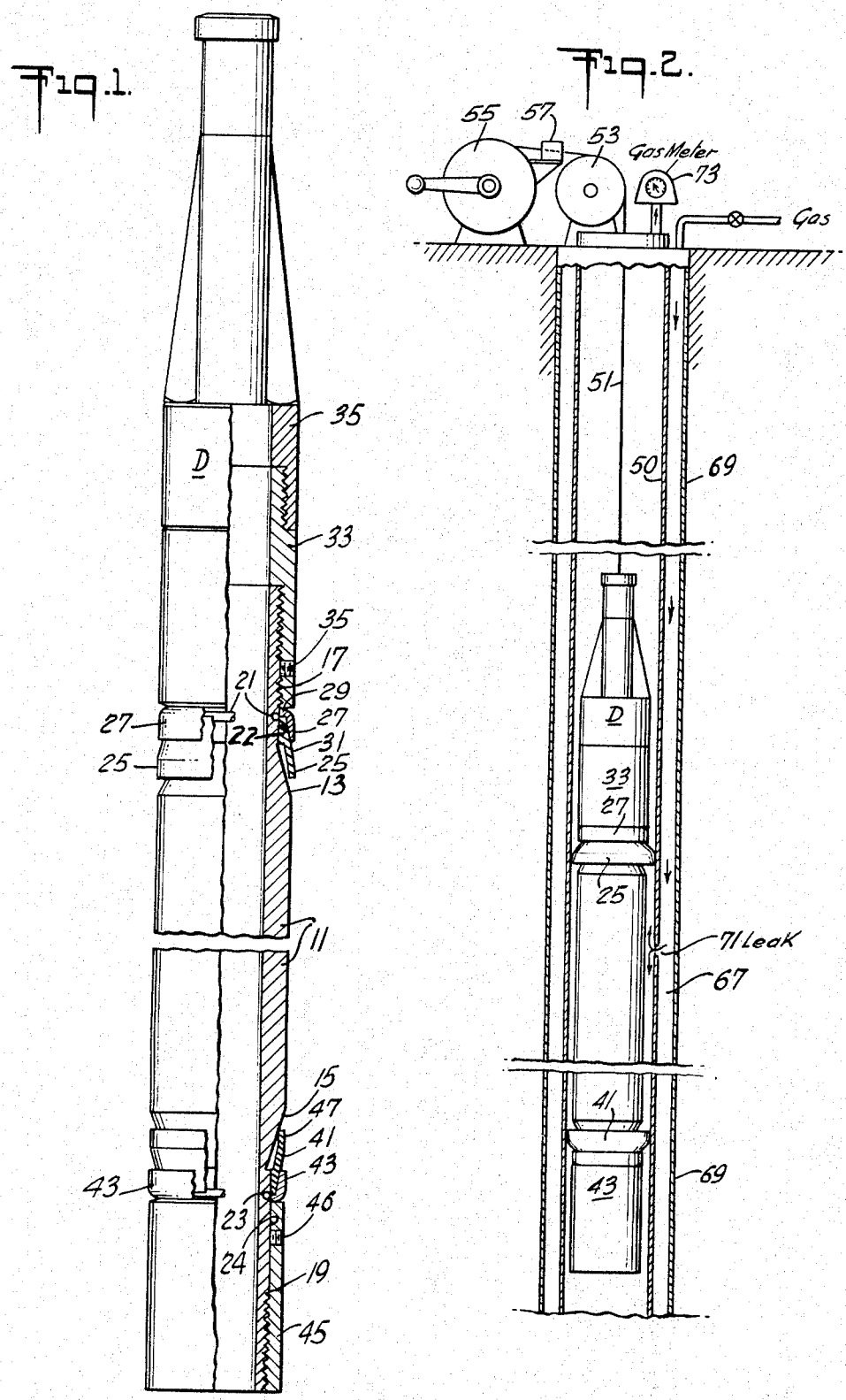

3,342,061
TUBING LEAK DETECTOR FOR WELLS, AND METHOD OF OPERATING SAME
Jack D. Morris, Houma, La., assignor to Texaco Inc., New York, N.Y., a corporation of Delaware
Filed July 15, 1965, Ser. No. 472,106
12 Claims. (Cl. 73—40.5)

ABSTRACT OF THE DISCLOSURE

Well tubing leak detector comprising a pair of flexible cup-like seals at opposite ends of a tubular member, which seals expand into contact with said tubing with an increase in pressure inside the tubing due to a leak in the tubing, thereby causing the detector to be firmly lodged in the tubing at the point of leakage.

---

The present invention relates to a novel device for locating a leak through the wall of the tubing of an oil or gas well, and to a novel method of locating such a leak, so that the leak may be readily sealed by depositing cement or a packer at the precise point of leakage.

The principles of the invention will be described in detail hereinafter with reference to the accompanying drawings, wherein:

FIG. 1 is a vertical sectional view, parts being shown in elevation, of a device constructed in accordance with my invention; and FIG. 2 is a schematic elevational view showing the device of FIG. 1 in position within an oil well at the point of leakage through the tubing.

Referring to FIG. 1 there is shown a leak detector D comprising a cylindrical body in the form of a tube 11 having upper and lower beveled shoulders 13 and 15 near opposite ends thereof which taper inwardly in opposite directions and terminate in reduced diameter threaded cylindrical end sections 17 and 19, respectively.

The reduced diameter end sections 17 and 19 are provided with O-rings 21 and 23 located within annular grooves in the short unthreaded portions 22 and 24 between the base of each set of threads and the beginning of the beveled shoulder.

An annular seal cup 25, of resilient flexible material such as rubber, is mounted on the unthreaded portion 22 of upper end section 17 for adjustment up or down, and comprises as a part thereof a metal retaining ring 27 which overlies a base portion of the cup and has an inwardly projecting flange 29 which abuts against and is also movable along the portion. Flange 27 and the base of the cup 25 overlie the O-ring 21 which provides a gas tight seal.

The seal cup 25 includes an unsupported skirt or lip 31 which projects downwardly from its base and has a free edge abut against and in contact with the beveled surface of the shoulder 13.

Adjustment of the seal cup 25 lengthwise of the tube 11 is accomplished by means of an internally threaded tubular connector sleeve 33 which is screwed onto the threads of section 17 tube and has a rim which abuts against the metal ring 27 to move the ring and cup to the desired position such that there will be only a very small clearance betwen the outer surface of the lip 31 and the inside surface of the tubing within which the device is to operate, e.g. 1/32 inch. Downward movement causes lateral expansion of the skirt 31 along the shoulder 13. When the proper adjusted position has been attained the connector 33 is secured in position by tightening a set screw 35 against the tube.

The upper portion of the device is completed by threading a standard tubular wireline running neck 35 onto the outside of the connector 33 for connection to a wireline.

The description of the upper seal cup construction applies also to the lower seal cup 41 which projects upwardly from its retaining ring 43 and is adjustable lengthwise by means of a second threaded connector 45 until the lip or skirt 47 is slightly less than the inside diameter of the tubing, whereupon its position is secured by a set screw 46.

The manner of operating the leak detector will be described in connection with FIG. 2 wherein there is shown a tubular leak detector D suspended within a tube 50 by a wireline 51 running over a sheave 53 and operated by a rotatable reel or drum 55. A conventional mechanism 57 for recording the length of the wireline reeled off the drum 55 is provided so that the location of the detector D in the tubing 50 is monitored.

The leak detector D is lowered into the tubing 50 while at the same time gas at high pressure such as air at about 200 p.s.i. is pumped down the annulus 67 between the tubing 50 and a casing 69. This gas, of course, passes through the leak 71 in the tubing and flows up the tubing and through the hollow interior of the detector D without actuating the opposed cups 25 and 41. However, upon reaching the leak the lower cup 41 passes over the leak and immediately the high pressure gas trapped within the space between the opposed upper and lower cups causes both cups to expand laterally into contact with the interior wall of the tube 50 and arrests the movement of the detector which thus straddles the leak. As a result, the location of the leak is marked by the detector, and its distance from the surface of the ground has been established by the known length of the wireline which has been reeled off the drum 55. With this information at hand it is then only necessary to seal off the leak by conventional methods such as cementing or locating packers in the annulus 67 at the leak locality.

When lowering the detector D it may not always be possible to sense at the surface the moment when the detector stops so that some slack wire may be reeled off and obscure the leak location. This can be avoided by metering the gas leaving the top of tubing 50 by a meter 73. A steady rate of gas flow is first established through the meter and maintained as the detector D is lowered. At the moment that cup 41 crosses over the leak, a deflection of the gas meter occurs to provide a signal due to arrest of the gas flow, and the operator stops the wireline at that moment when he observes the signal.

Alternatively, the detector D can be operated by lowering it to the bottom of the tubing before gas flow is initiated, and then raising the detector until the upper cup 25 crosses the leak and the device stops—with or without a gas meter. In this bottom-up procedure the detector need not have a passage therethrough for the flow of gas therethrough.

After the leak has been located, the detector can be withdrawn from the tubing by stopping the flow of gas into the annulus 67, thus equalizing the pressures in the annulus and tubing and causing the cups 25 and 41 to collapse to their original position and restore clearance.

If the weight of the detector itself is insufficient for rapid traverse of the tubing, it is loaded with conventional sinker bars and jars to carry it down more rapidly.

Obviously, many modifications and variations of the invention, as hereinbefore set forth, may be made without departing from the spirit and scope thereof, and therefore only such limitations should be imposed as are indicated in the appended claims.

I claim:
1. A tubing leak detector comprising a body adapted to be passed through well tubing;
a pair of annular cups of flexible resilient material located on the outside of said body in longitudinally spaced opposed relation to one another;

one of said cups comprising a supported base and a skirt projecting downwardly therefrom;

the other of said cups comprising a supported base and a skirt projecting upwardly therefrom;

means for pre-adjusting the diameter of each of said skirts so as to adjust the clearance between the outside of each skirt and the internal wall of said tubing during passage of said body therethrough;

the construction and arrangement being such that when said body is passed through tubing having a leak through which high pressure gas is entering said tubing, said cups are both expanded into contact with the internal wall of said tubing after the passage of one of said cups across said leak.

2. A leak detector in accordance with claim 1 wherein said pre-adjusting means comprises a pair of longitudinally spaced beveled surfaces on said body; each of said skirts having a free edge thereof in contact with the corresponding beveled surface; and means for moving each of said cups lengthwise of said body so that said beveled surfaces force said skirts outwardly.

3. A leak detector in accordance with claim 2 wherein said means for moving said cups lengthwise comprises a pair of sleeves threaded over the outside of said body adjacent opposite ends thereof and having rims abutting against said cups so as to move said cups lengthwise when said sleeves are rotated; each of said sleeves carrying a set screw for fixing said sleeves in adjusted position.

4. A leak detector in accordance with claim 2, also comprising a metal ring supporting the base of each cup on the outside thereof; said body also carrying a pair of O-ring seals for sealing said rings and said bases against said body; and said moving means comprising a pair of sleeves threaded over the outside of said body adjacent the opposite ends thereof and bearing against said retaining rings, whereby rotating motion of said sleeves is converted to longitudinal motion of said cups.

5. A leak detector in accordance with claim 1 having a passage therethrough for the flow of gas therethrough as said detector is lowered into a tubing string.

6. Apparatus for detecting and locating a leak through the side wall of a well tubing string which has a length of well tubing;

a casing surrounding said tubing in spaced relation thereto to provide an annulus therebetween;

said detecting apparatus comprising a detector in said tubing comprising a body carrying externally thereon a pair of longitudinally spaced opposed cups carried externally on said body and formed of flexible resilient material whereby the introduction of high pressure gas into the space between said cups causes said cups to expand outwardly into contact with the internal wall of said tubing;

means for injecting gas at high pressure into said annulus and thence through a leak into said tubing;

means for moving said detector through said tubing to locate a leak therein; and means for monitoring the position of said leak detector in said tubing so as to establish the position of a leak when movement of said detector is arrested.

7. Apparatus in accordance with claim 6, also comprising means for metering the gas leaving the top of said tubing, said last named means including signal mechanism observable to indicate when the flow of gas out of said tubing stops as the result of said detector straddling a leak.

8. Apparatus in accordance with claim 6 also comprising a wireline extending from the top of said detector through said tubing to the surface of the earth;

mechanism for moving said wireline and detector through said tubing; and mechanism for measuring the length of wireline within said tubing.

9. The method for locating the position of a leak in the side wall of a well tubing string located within and spaced from a well casing to provide an annulus therebetween; said method comprising injecting a flowing stream of gas into said annulus to flow downwardly therein and through said leak into said tubing string; passing through said tubing string a leak detector comprising a body having a pair of spaced opposed annular cups of flexible resilient material on the outside thereof; monitoring the position of said detector as it passes through said tubing string; and observing said position when said detector stops as the result of one of said cups passing across said leak whereby gas expands both of said cups into contact with the wall of said tubing string.

10. A method in accordance with claim 9 wherein said leak detector is tubular whereby gas can pass therethrough from the bottom to the top thereof; said detector being passed downwardly through said tubing string while gas entering said tubing string through said leak flows upwardly through said detector until the lower cup passes across said leak and both of said cups are expanded into contact with the wall of said tubing string.

11. A method in accordance with claim 10 also comprising metering the gas passing upwardly out of said tubing string; observing said meter; and establishing the location of said leak at the moment when said cup passes across said leak by observing a signal from said meter due to the shutting off of gas flow up through said detector by the expansion of said cups into contact with the internal wall of said tubing string.

12. The method in accordance with claim 9 wherein said detector is passed upwardly through said tubing string from a position near the bottom thereof until it locates said leak.

References Cited

UNITED STATES PATENTS

| | | | |
|---|---|---|---|
| 1,548,012 | 7/1925 | Dunn. | |
| 1,744,698 | 1/1930 | Granger | 73—40.5 |
| 2,383,455 | 8/1945 | Abadie. | |
| 2,731,827 | 1/1956 | Loomis | 73—40.5 |
| 2,767,795 | 10/1956 | Bush. | |

LOUIS R. PRINCE, Primary Examiner.

J. NOLTON, Assistant Examiner.